(12) United States Patent
Gipson

(10) Patent No.: US 8,794,655 B1
(45) Date of Patent: Aug. 5, 2014

(54) SHOPPING CARTS FOR USE WITH WHEELCHAIRS

(71) Applicant: Terry Gipson, Joliet, IL (US)

(72) Inventor: Terry Gipson, Joliet, IL (US)

( * ) Notice: Subject to any disclaimer, the term of this patent is extended or adjusted under 35 U.S.C. 154(b) by 0 days.

(21) Appl. No.: 13/873,498

(22) Filed: Apr. 30, 2013

(51) Int. Cl.
*A61G 5/10* (2006.01)
*B62B 1/00* (2006.01)

(52) U.S. Cl.
CPC .................... *B62B 1/008* (2013.01)
USPC ............... 280/304.1; 280/304.5; 280/33.992; 280/33.993

(58) Field of Classification Search
USPC ................ 280/304.1, 289, 33.992, 33.993
See application file for complete search history.

(56) References Cited

U.S. PATENT DOCUMENTS

| | | | |
|---|---|---|---|
| 2,596,055 A | 10/1947 | Thomas | |
| 3,398,974 A | 8/1968 | Edwards | |
| 3,792,875 A | 2/1974 | Paden | |
| 4,158,428 A | 6/1979 | Bates | |
| 4,257,545 A | 3/1981 | Rhyan | |
| 4,305,601 A * | 12/1981 | Berge | 280/304.1 |
| 4,484,755 A | 11/1984 | Houston | |
| 4,555,124 A | 11/1985 | Millington | |
| 4,795,182 A | 1/1989 | Dyess et al. | |
| 4,902,029 A | 2/1990 | Gain et al. | |
| 5,083,807 A * | 1/1992 | Bobb et al. | 280/304.1 |
| 5,356,059 A | 10/1994 | Yanez et al. | |
| 5,794,957 A | 8/1998 | Mendon | |
| 6,467,797 B1 | 10/2002 | Lofy | |
| 6,702,313 B2 | 3/2004 | Forshee et al. | |
| 2004/0160027 A1* | 8/2004 | Conrad | 280/33.993 |

* cited by examiner

*Primary Examiner* — Joseph M Rocca
*Assistant Examiner* — Marlon Arce
(74) *Attorney, Agent, or Firm* — The Law Offices of Konrad Sherinian, LLC

(57) ABSTRACT

A shopping cart for use with a wheelchair includes two wheeled front legs and a rear leg. The rear leg is not attached to a wheel. The rear leg is adapted to be mounted to a foot rest of the wheelchair. The shopping cart also includes a container device supporting frame. The frame is coupled to and supported by the front legs and the rear leg.

9 Claims, 4 Drawing Sheets

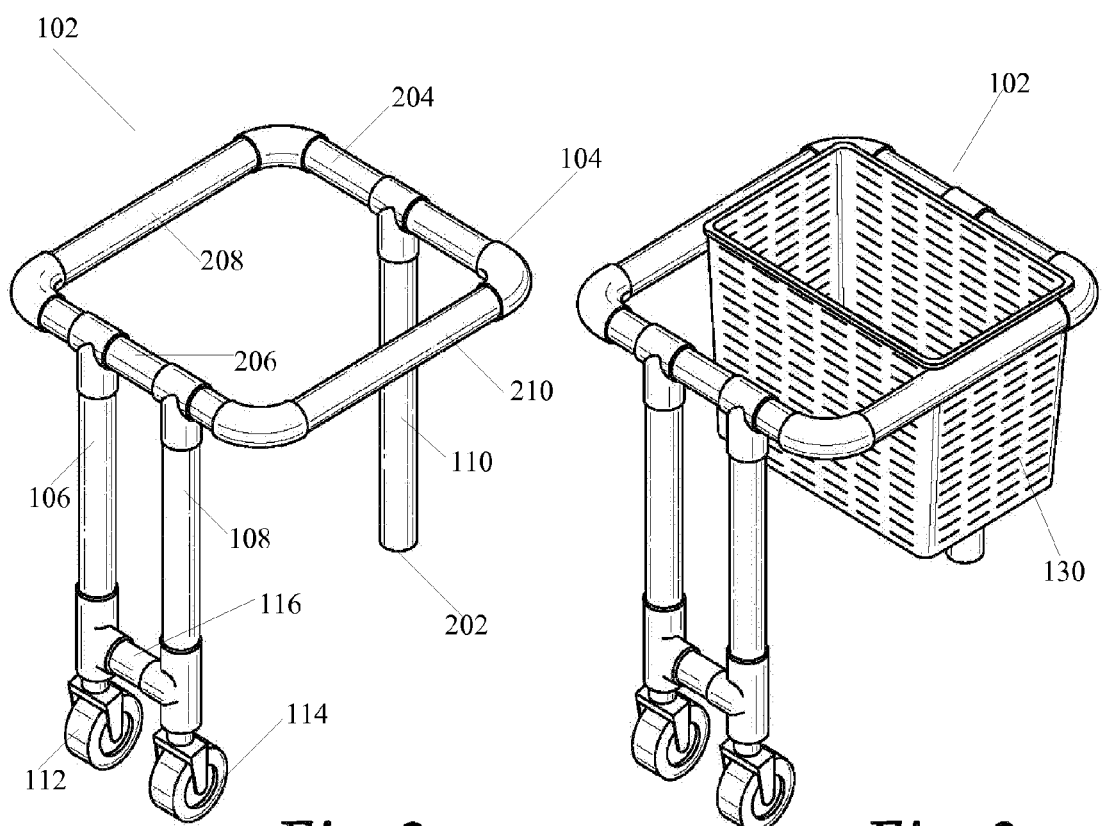

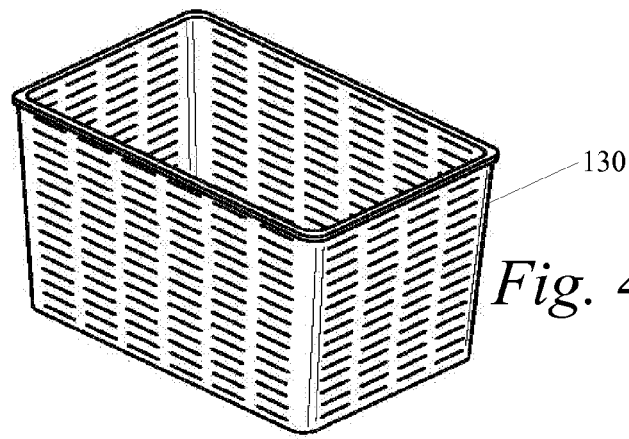
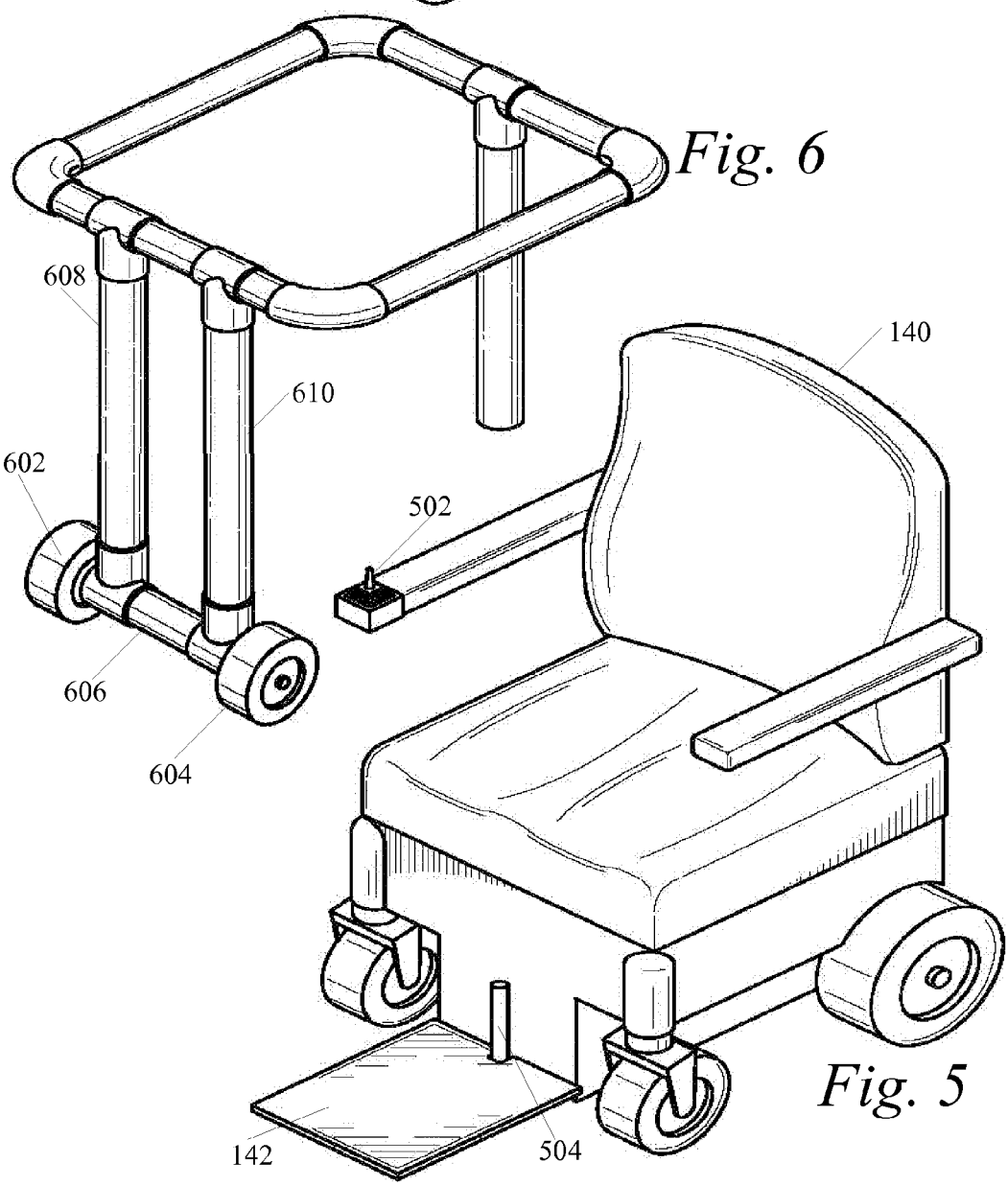

SHOPPING CARTS FOR USE WITH WHEELCHAIRS

FIELD OF THE DISCLOSURE

The present invention relates to shopping carts, and more particularly relates to a shopping cart for use with a wheelchair.

DESCRIPTION OF BACKGROUND

Shopping carts are usually provided by retail outlets or stores for their patrons to transport merchandise. For example, supermarkets make four-wheeled shopping carts available for their customers to transport goods to the checkout counters and then to their vehicles parked outside of the supermarkets. Many stores also provide special shopping carts, such as motorized shopping carts or scooters, for the elderly or people with disabilities. The motorized shopping carts are electric wheelchairs with shopping baskets attached thereto. Use of the motorized shopping carts is often challenging because it requires the users to board the motorized shopping carts.

Various devices have been developed to mount conventional shopping carts to wheelchairs. Oftentimes, such devices present a different type of challenge to the elderly or people with disabilities. For example, these special users may not be physically capable of mounting the shopping carts to their wheelchair. As an additional example, the conventional shopping carts can be too heavy and/or tall for these users.

Accordingly, there is a need for a shopping cart that is easy to access and maneuver by the elderly and people who are limited to wheelchairs.

OBJECTS OF THE DISCLOSED SYSTEM, METHOD, AND APPARATUS

Accordingly, it is an object of this disclosure to provide a cart for use with a wheelchair.

Another object of this disclosure to provide a shopping cart for use with a wheelchair.

Another object of this disclosure is to provide a shopping cart that is light for an elderly or a disabled person who is limited to wheelchairs.

Another object of this disclosure is to provide a shopping cart that is convenient to attach or mount to a wheelchair by an elderly or a disabled person who is limited to wheelchairs.

Another object of this disclosure is to provide a shopping cart that is convenient to detach or dismount from a wheelchair by an elderly or a disabled person who is limited to wheelchairs.

Another object of this disclosure is to provide a shopping cart with a shopping basket that is easy to access and use by an elderly or a disabled person who is limited to wheelchairs.

Another object of this disclosure is to provide a shopping cart with a shopping basket that is easy to maneuver by an elderly or a disabled person who is limited to wheelchairs.

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

Generally speak and pursuant to the various embodiments, the present disclosure provides a shopping cart for use with a wheelchair. In accordance with the present teachings, the shopping cart includes two wheeled front legs and a rear leg. Without a wheel attached to it, the rear leg is adapted to be mounted to a foot rest of the wheelchair. The shopping cart also includes a container device supporting frame. The frame is coupled to and supported by the front legs and the rear leg.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 2 is a top, front, left side perspective view of a shopping cart in accordance with this disclosure;

FIG. 3 is a top, front, left side perspective view of a shopping cart with a shopping basket in accordance with this disclosure;

FIG. 4 is a top, front, left side perspective view of a shopping basket in accordance with this disclosure;

FIG. 5 is a top, front, left side perspective view of a wheelchair in accordance with this disclosure;

FIG. 6 is a top, front, left side perspective view of a shopping cart in accordance with this disclosure;

DETAILED DESCRIPTION

Figure 1:
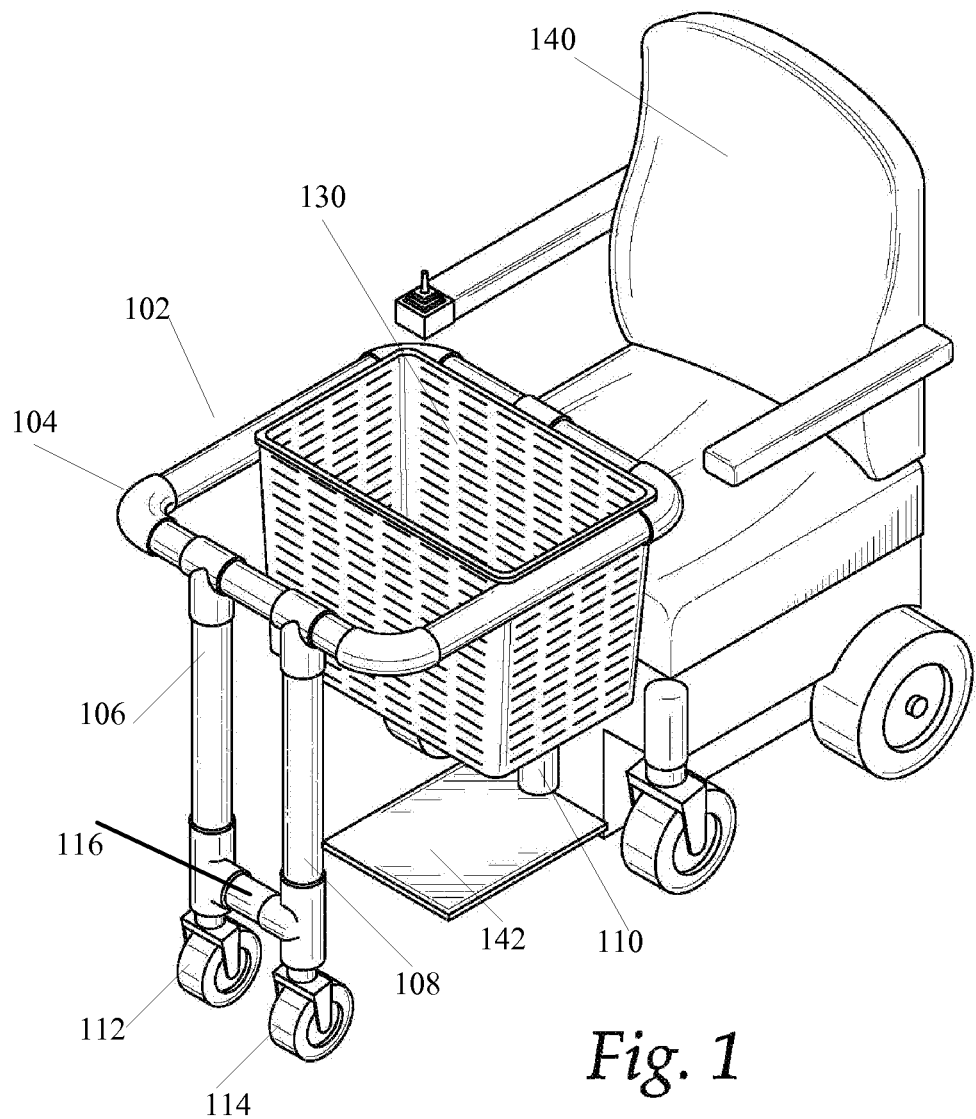
FIG. 1 is a top, front, left side perspective view of a shopping cart attached to a wheelchair constructed in accordance with this disclosure.

Turning to the Figures and to FIG. 1 in particular, a top, front, left side perspective view of a shopping cart 102 with a shopping basket 130 is shown. The shopping cart 102 is attached or mounted to a wheelchair 140 with a foot rest 142. The shopping cart 102 and the shopping basket 130 can be used in a setting that is different from a retail shop or supermarket. The shopping basket 130 can be other types of container devices. Moreover, the shopping basket 130 can be a container device fixed to or part of the shopping cart 102. The wheelchair 140 is further illustrated by reference to FIG. 5. Referring now to FIG. 5, in addition to the foot rest 142, the wheelchair 140 further includes a navigation control 502 and a mounting rod 504. The mount rod 504 extends upward vertically from the foot rest 142. In one implementation, the rod 504 is a round rod. Alternatively, the rod 504 can take other shapes, such as square.

Turning back to FIG. 1, the shopping cart 102 includes a shopping basket supporting frame 104 supported by two front legs 106 and 108 and a rear leg 110. Two wheels 112 and 114 are attached to the bottom ends of the two front legs 106 and 108 respectively. In the illustrative embodiment, the two wheels 112 and 114 are swivel wheels. The shopping cart 102 further includes a horizontal bar 116 coupled and mounted to the two front legs 106 and 108. Without a wheel, the rear leg 110 is attached to the foot rest 142. Alternatively, the rear leg 110 is attached to a different part, for example, such as a front leg, of the wheelchair 140. The shopping cart 102 is further illustrated by reference to FIGS. 2 and 3.

Turning now to FIG. 2, the shopping basket supporting frame 104 of the shopping cart 102 includes a rear frame 204, two side frames 208 and 210, and a front frame 206. In one embodiment, the joints between the frames 204, 208, 206, 210 are round corners. In a further implementation, the frame 104 is in a roughly rectangular shape. The two side frames 208 and 210 support the weight of the shopping basket 130 (as shown in FIG. 4). In one implementation, the shopping basket 130 can be moved back and forth on the frame 104. The rear and front frames 204 and 206 limit the moving range of the shopping basket 130. When the basket 130 is closer to the frame 206, more leg room is available for a rider of the wheelchair 140. In the opposite, the basket 130 is closer to the frame 204, less leg room is available for the rider. However, in this case, the basket 130 is closer to the rider for easier access to the basket 130. In a further implementation, the shopping cart 102 includes a strengthening bar (not shown) coupled and mounted to the rear leg 110 and the horizontal bar 116. The bottom portion of the rear leg 110 includes a vertical bore or cavity 202 for receiving part or the whole of the mounting rod 504.

The shopping cart 102 with the shopping basket 130 is shown in FIG. 3. In one setting, such as a retail store or shop, the shopping basket 130 is used to contain and hold goods. In a different setting, such as a public library, the shopping basket 130 is used to contain and hold books. In another setting, such as a nursing home, the shopping basket 130 is used to contain and hold various items used in a senior's daily life.

To use the shopping cart 102, a rider of the wheelchair 140, or a different person (such as a store clerk), holds the cart 102. For example, the rider uses her two hands to grab the frame 204. The rider then aligns the rear leg 110 with the cavity 202 with the mounting rod 504. Once the rear leg 110 is aligned with the mounting rod 504, she slowly releases the weight of the cart 102. Accordingly, the rear leg 110 falls or goes down, and the cavity 202 receives the rod 504. In other words, the rear leg 110 is operatively coupled with the mounting rod 504. The rear leg 110 can turn left and right around the rod 504. Once the rear leg 110 is operatively coupled with the rod 504, and the weight of the rear portion of the cart 102 is fully supported by the rod 504 and the foot rest 142, the rider can then move the cart 102.

To move the shopping cart 102, the rider moves the wheelchair 140 by operating the navigation control 502. When the wheelchair 140 moves forward, the wheelchair 140 pushes the cart 102 forward. On the contrary, when the wheelchair 140 moves backward, the wheelchair 140 pulls the cart 102 backward. To control the direction in which the cart 102 moves, the rider can use one or two hands to hold the frame 204. For example, when the cart 102 moves forward, the rider uses her left hand to push forward the left end of the frame 204, and/or uses her right hand to pull back the right end of the frame 204. Accordingly, the cart 102 moves and turns toward the rider's right side. Similarly, when the cart 102 moves forward, the rider uses her left hand to pull back the left end of the frame 204 forward, and/or uses her right hand to push forward the right end of the frame 204. Accordingly, the cart 102 moves and turns toward the rider's left side.

To detach or dismount the cart 102 from the wheelchair 140, the rider grabs the frame 204, or the frames 208 and 210, and raises the cart 102. Once the rod 504 is completely out of the cavity 202, the rider pushes the cart 102 forward, and/or to the left or right side of the rider. Then, she drops the cart 102.

Where the shopping basket 130 is not already loaded into the shopping cart 102, the rider or store clerk obtains and retrieves the shopping basket 130. Thereafter, the rider places the shopping basket 130 between the frames 208 and 210. While the shopping basket 130 is resting inside the supporting frame 104, the rider can push the basket 130 forward, or pull it backward.

In an alternate embodiment, the foot rest 142 includes an aperture for receiving the rear leg 110. Moreover, the rear leg 110 has a portion with a larger diameter than the aperture to prevent the rear leg 110 from falling through the aperture. In such a case, the rider aligns the rear leg 110 with the aperture. Once they are aligned, the rider drops or releases control of the rear leg 110. When the portion of the rear leg 110 with a bigger diameter engages with the top surface of the foot rest 142, the shopping cart 102 is attached and mounted to the foot rest 142. To detach and dismount the shopping cart 102 from the wheelchair 140, the rider simply lifts the cart 102 and pushes it aside and/or forward.

Figure 7A:
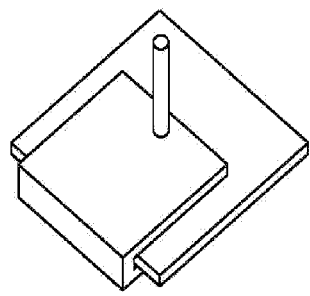
FIG. 7A is a top, front, right side perspective view of a shopping cart mounting device in accordance with this disclosure.
Figure 7C:
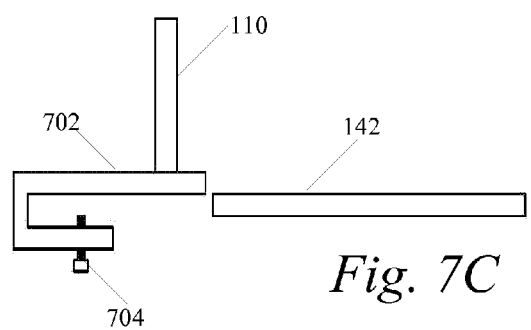
FIG. 7C is a side view of a shopping cart mounting device in accordance with this disclosure.
Figure 7B:
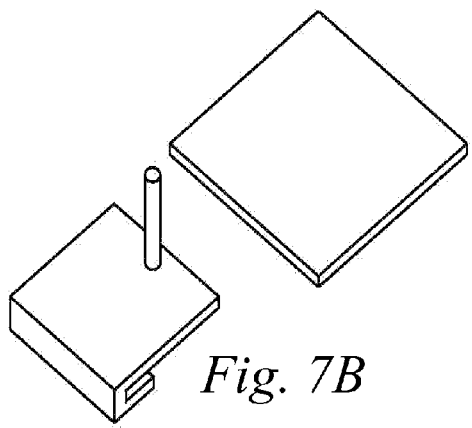
FIG. 7B is a top, front, right side perspective view of a shopping cart mounting device in accordance with this disclosure.
Figure 7D:
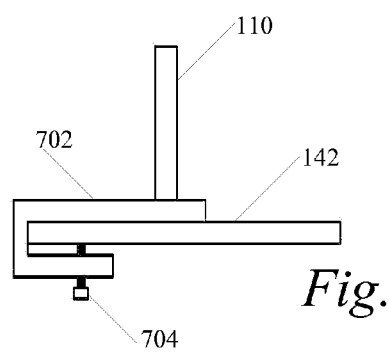
FIG. 7D is a side view of a shopping cart mounting device in accordance with this disclosure.

In a different embodiment of the shopping cart 102, as shown in FIG. 6, two wheels 602 and 604 are attached onto a horizontal bar 606. Front legs 608 and 610 are also mounted and coupled to the horizontal bar 606. In a further different embodiment, as shown in FIGS. 7A, 7B, 7C, 7D, a mounting device 702 is attached to the rear leg 110. The U shaped device 702 receives that foot rest 142. A locking device 704, such as a screw, fastens the mounting device 702 to the foot rest 142. For example, FIG. 7C shows a position where the mounting device 702 is disengaged from the foot rest 12, while FIG. 7D illustrates a position where the mounting device 702 is tightly engaged with the foot rest 12.

Obviously, many additional modifications and variations of the present disclosure are possible in light of the above teachings. Thus, it is to be understood that, within the scope of the appended claims, the disclosure may be practiced otherwise than is specifically described above. For example, a locking mechanism known to a person skilled in the art may be deployed to firmly attach the rear leg 110 to the foot rest 142. Correspondingly, an unlocking mechanism can be utilized to unlock and detach the rear leg 110 from the foot rest 142.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It is intended that the scope of the disclosure not be limited by the specification, but be defined by the claims set forth below.

What is claimed is:

1. A shopping cart for use with a wheelchair comprising:
    i. two wheeled front legs;
    ii. a single vertical rear leg without a wheel, wherein a lower portion of the rear leg is operatively and vertically coupled with the wheelchair; and
    iii. a container device supporting frame wherein the supporting frame is coupled to and supported by the front legs and the rear leg, and adapted to support a container device.

2. The shopping cart of claim 1 wherein the rear leg is adapted to be mounted to a foot rest of the wheelchair.

3. The shopping cart of claim 2 wherein the container device supporting frame is in a roughly rectangular shape.

4. The shopping cart of claim 2 wherein the container device supporting frame is adapted to allow the container device to move relative to the container device supporting frame.

5. The shopping cart of claim 2 wherein the shopping cart further comprising a horizontal bar coupled to the two wheeled front legs.

6. The shopping cart of claim 2 wherein the shopping cart further comprising a strengthening bar coupled to the horizontal bar and the rear leg.

7. The shopping cart of claim 1 wherein the container device is a shopping cart.

8. A shopping cart for use with a wheelchair comprising:
i. two wheeled front legs;
ii. a rear leg without a wheel, wherein the rear leg is adapted to be operatively coupled with the wheelchair and wherein the rear leg is adapted to be mounted to a foot rest of the wheelchair, wherein a bottom portion of the rear leg comprises a cavity, wherein the cavity is adapted to receive a mounting rod that extends upward from the foot rest; and
iii. a container device supporting frame wherein the supporting frame is coupled to and supported by the front legs and the rear leg, and adapted to support a container device.

9. A shopping cart for use with a wheelchair comprising:
iv. two wheeled front legs;
v. a rear leg without a wheel, wherein the rear leg is adapted to be operatively coupled with the wheelchair and wherein the rear leg is adapted to be mounted to a foot rest of the wheelchair, wherein the foot rest comprises an aperture for receiving a bottom portion of the rear leg and the rear leg comprises a thick portion with a diameter bigger than that of the aperture; and
vi. a container device supporting frame wherein the supporting frame is coupled to and supported by the front legs and the rear leg, and adapted to support a container device.

* * * * *